US012602482B2

(12) United States Patent
Das et al.

(10) Patent No.: US 12,602,482 B2
(45) Date of Patent: Apr. 14, 2026

(54) SYSTEMS AND METHODS FOR UPDATING A NETWORK APPLIANCE

(71) Applicant: Sophos Limited, Abingdon (GB)

(72) Inventors: Dipak Kr Das, Bangalore (IN); Avni Bhupendrakumar Wala, Bangalore (IN); Kartikeya, Bangalore (IN)

(73) Assignee: Sophos Limited (GB)

( * ) Notice: Subject to any disclaimer, the term of this patent is extended or adjusted under 35 U.S.C. 154(b) by 273 days.

(21) Appl. No.: 18/382,723

(22) Filed: Oct. 23, 2023

(65) Prior Publication Data

US 2025/0061201 A1    Feb. 20, 2025

(30) Foreign Application Priority Data

Aug. 16, 2023    (IN) .............................. 202311054996

(51) Int. Cl.
*G06F 9/44*       (2018.01)
*G06F 21/57*      (2013.01)
*H04L 9/40*       (2022.01)

(52) U.S. Cl.
CPC ........ *G06F 21/572* (2013.01); *H04L 63/0823* (2013.01)

(58) Field of Classification Search
CPC ........................... G06F 21/572; H04L 63/0823
See application file for complete search history.

(56)    References Cited

U.S. PATENT DOCUMENTS

| | | | |
|---|---|---|---|
| 8,484,474 B2 * | 7/2013 | Batke ...................... | G06F 21/44 |
| | | | 713/175 |
| 9,430,658 B2 * | 8/2016 | Covey .................... | G06F 9/4401 |
| 2022/0092187 A1 * | 3/2022 | Tonry ...................... | G06F 21/33 |
| 2023/0035801 A1 * | 2/2023 | Campetti .............. | G06F 21/575 |
| 2025/0224953 A1 * | 7/2025 | Qian ........................ | G06F 8/65 |

* cited by examiner

*Primary Examiner* — Qamrun Nahar
(74) *Attorney, Agent, or Firm* — Danielson Legal LLC

(57)              ABSTRACT

Systems and methods for updating a network appliance. The method includes receiving an update request from a network appliance, wherein the update request includes at least one self-signed certificate; executing an authentication procedure to authenticate the network appliance; providing the network appliance with at least one updated certificate associated with a controller device; enabling communication between the appliance and a controller device; and providing to the appliance a network resource location indicator of a firmware repository including an updated firmware version to allow the appliance to obtain the updated firmware version.

20 Claims, 5 Drawing Sheets

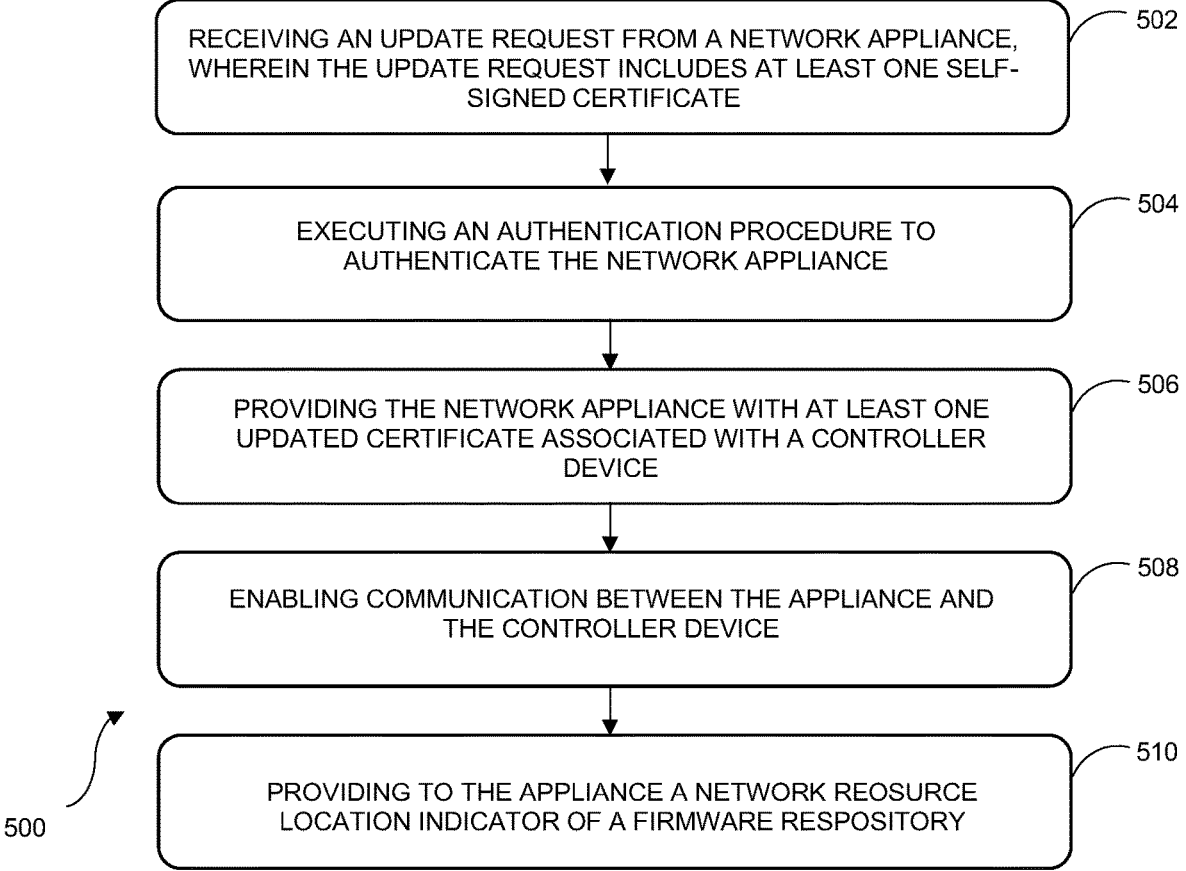

RECEIVING AN UPDATE REQUEST FROM A NETWORK APPLIANCE, WHEREIN THE UPDATE REQUEST INCLUDES AT LEAST ONE SELF-SIGNED CERTIFICATE ⸺ 502

EXECUTING AN AUTHENTICATION PROCEDURE TO AUTHENTICATE THE NETWORK APPLIANCE ⸺ 504

PROVIDING THE NETWORK APPLIANCE WITH AT LEAST ONE UPDATED CERTIFICATE ASSOCIATED WITH A CONTROLLER DEVICE ⸺ 506

ENABLING COMMUNICATION BETWEEN THE APPLIANCE AND THE CONTROLLER DEVICE ⸺ 508

PROVIDING TO THE APPLIANCE A NETWORK REOSURCE LOCATION INDICATOR OF A FIRMWARE RESPOSITORY ⸺ 510

SYSTEMS AND METHODS FOR UPDATING A NETWORK APPLIANCE

CROSS-REFERENCE RELATED TO APPLICATIONS

This application claims the benefit of and priority to Indian Patent Application number 202311054996, filed on Aug. 16, 2023, and titled "Systems and Methods for Updating a Network Appliance," the disclosure of which is hereby incorporated by reference in its entirety.

TECHNICAL FIELD

The present application relates generally to systems and methods for monitoring network activity and, more particularly but not exclusively, to systems and methods for updating network appliances.

BACKGROUND

Root certificates are typically bundled with an appliance's firmware. A root certificate may be associated with a cloud-based service, such that the appliance can communicate with the service. For cloud-managed appliances, however, the cloud-side certificates or firmware may be outdated by the time a customer orders, receives, and boots up the appliance. For example, appliance manufacturers often manufacture their appliances in bulk and may store the appliances in a warehouse before they are ultimately ordered and shipped to a customer. During this time, the cloud-side certificates may expire or the issuer of the certificate(s) may change such that the appliance will be unable to connect to the service.

Firmware installed on an appliance may similarly become outdated by the time the appliance is booted up. That is, an appliance may boot up on-premise at a customer location but with an outdated version of firmware.

A need exists, therefore, for systems and methods for updating appliances at or upon bootup at a customer location.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

Embodiments herein provide systems and methods for updating certificates, firmware, or both, such as during bootup at a customer location. Once or as a customer boots up an appliance for the first time, the embodiments herein enable the appliance to gather the most up-to-date certificates, firmware, or both.

For example, to obtain the most up-to-date root certificates of cloud resources, the appliances described herein can contact a hosted service using stored self-signed certificates. These self-signed certificates have long expiration dates (e.g., 20 years). The appliance can then extract and install the certificates provided by the hosted service, and will then be able to trust cloud resources based on the newly-installed certificates.

To obtain the most up-to-date firmware, the appliances described herein can contact a cloud controller service that monitors releases of firmware updates. The cloud controller may provide the appliance with a network location from which the appliance can download the most recent firmware.

BRIEF DESCRIPTION OF DRAWINGS

Non-limiting and non-exhaustive embodiments of the invention are described with reference to the following figures, wherein like reference numerals refer to like parts throughout the various views unless otherwise specified:

FIG. 5 depicts a flowchart of a method for updating an appliance in accordance with one embodiment.

DETAILED DESCRIPTION

Figure 1:
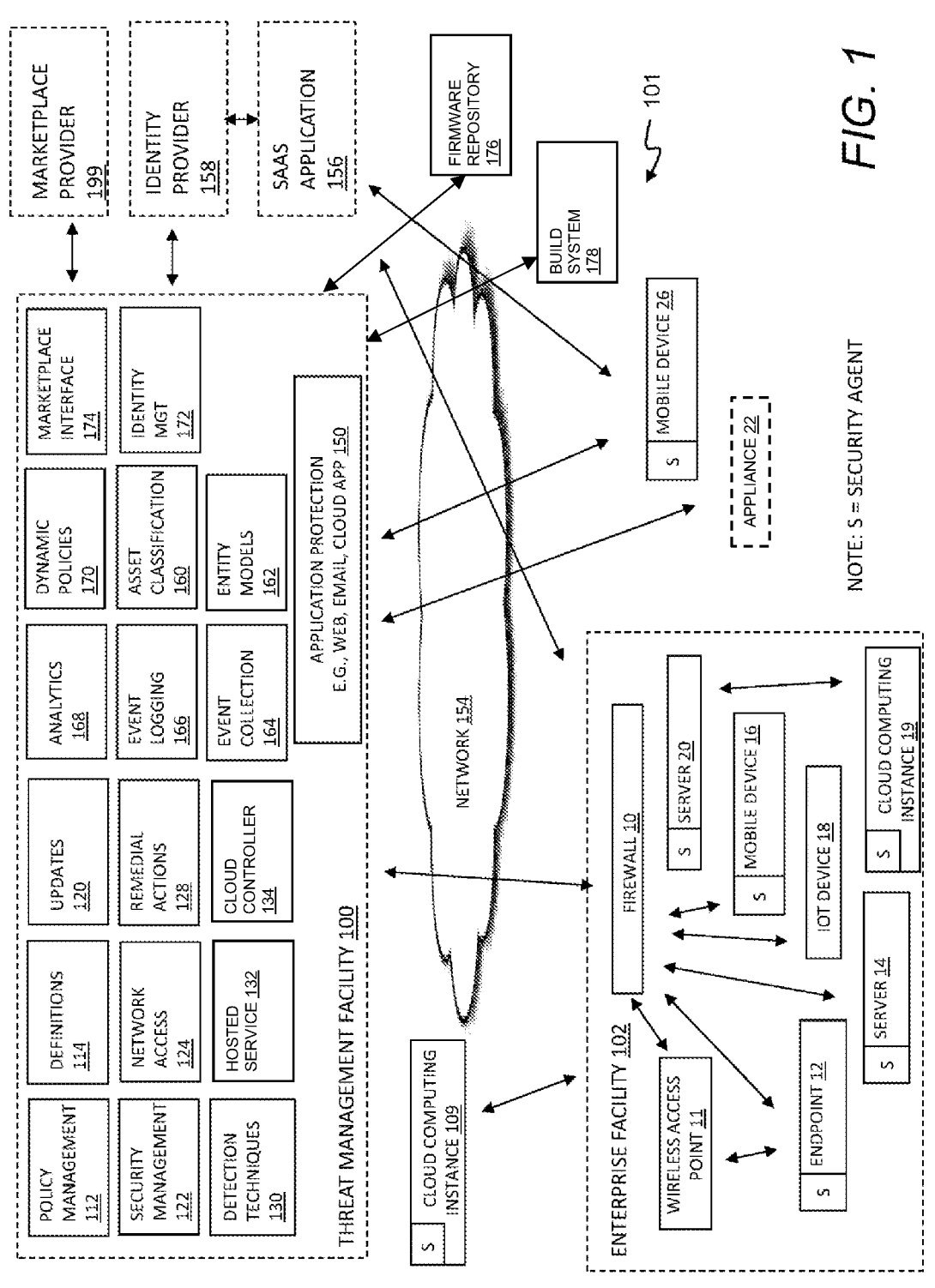
FIG. 1 illustrates a block diagram of a threat management system in accordance with one embodiment.

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Appliances such as network security appliances may be manufactured with or otherwise include certain versions of firmware. In the context of the present application, "firmware" may refer to a program or microcode embedded into the appliance to allow the appliance to operate as intended.

These appliances may also be manufactured with or otherwise include certificates of network resources. Generally, certification authorities issue digital certificates to network resources upon request, and the network resources use the issued digital certificates to verify their identity. When a user attempts to access a server (e.g., to visit a web page) their web browser receives the server's digital certificate, which verifies the server's identity. Accordingly, the user knows they are visiting an authenticated web page or otherwise the web page they intended to visit.

Digital certificates vary among different servers and certification authorities, but they tend to include similar features. These features may include, for example and without limitation, the issuing certification authority, the owner's name, a common name of the owner, the owner's country, the owner's city, a device's IP address, etc. Digital certificates also contain a copy of a public key issued by the certification authority. In operation, the public key is matched with a corresponding private key as part of the verification process between a client device and the server.

Accordingly, appliances may be manufactured to include root certificates of trusted cloud-based resources. This allows the appliance to, upon or after bootup, know which cloud-based resources they can trust. When an appliance reaches out to the resource, the resource may present its own chain of certificates, which ends with the root certificate. The appliance may use its stored root certificate and verify that it can build the certificate chain or otherwise establish a chain of trust with the resource. However, if any intermediate certificates expire, the appliance may be unable to build the certificate chain. Similarly, if the certificate issuer changes, the appliance will not be able to connect to the resource.

As discussed previously, however, appliances often remain in storage for an extended period of time before they are actually ordered by customer, shipped to a customer, booted up by the customer, etc. For example, manufacturers of network appliances typically manufacture the appliances in bulk, and then store the appliances in a warehouse or designated storage location. The appliances may remain at these locations for at least several months, if not longer.

Accordingly, an appliance's firmware, certificates, or both, may be outdated by the time the appliance is actually deployed. Regarding firmware, the manufacturer may have discovered bugs or vulnerabilities associated with the original firmware, and may have since developed updated or improved firmware. Regarding certificates, the certificate issuer may change during the time between manufacture and deployment. As a result, the appliance may not have the root certificate of the new provider and the appliance won't know which resource(s) to trust.

The embodiments herein provide novel techniques and devices to address these problems. As a customer boots up an appliance for the first time, the appliance may first take steps to gather the most up-to-date certificates. For example, the appliances described herein may be manufactured with a plurality of self-signed certificates that have long expiration dates (e.g., 20 years). In the context of the present application, a "self-signed" certificate may refer to a certificate that is not necessarily signed by a publicly-trusted certificate authority, but instead by the manufacturer of the appliance.

To obtain the most up-to-date certificates of cloud resources, the appliances described herein can contact a hosted service based on the self-signed certificates stored with the appliance. The hosted service may then reply with the current or updated certificates. The appliance can then extract and install the received certificate(s), and will be able to trust cloud resources based on the newly-installed certificates.

Regarding firmware, a cloud controller device may routinely update a firmware repository with firmware updates. Upon or after appliance bootup, the appliance may contact a cloud controller and provide the cloud controller with metadata about the appliance. The cloud controller may in turn provide a link (e.g., a uniform resource locator (URL)) to the appliance indicating where the appliance can obtain the most up to date firmware.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a firewall 10, a wireless access point 11, an endpoint 12, a server 14, a mobile device 16, an appliance or Internet-of-Things (IoT) device 18, a cloud computing instance 19, and a server 20. Again, the compute instances 10-20 depicted are by way of example, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include or otherwise be in communication certain facilities, such as a policy management facility 112, security management facility 122, update facility 120, definitions facility 114, network access facility 124, remedial action facility 128, detection techniques facility 130, one or more hosted services 132, a cloud controller 134, application protection 150, asset classification facility 160, entity model facility 162, event collection facility 164, event logging facility 166, analytics facility 168, dynamic policies facility 170, identity management facility 172, and marketplace interface facility 174, a firmware repository 176, a build system 178, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a firewall 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a software-as-a-service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22 or 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Examples of commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an network 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Examples of rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. These policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination.

Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, macOS, OS X, Linux, Android, IOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility 100 may include the entity model facility 162. The entity models may be used, for example, to determine the events that are generated by assets. For example, some operating systems may provide useful information for detecting or identifying events. For examples, operating systems may provide process and usage information that accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. One example of an event is the communication of a specific packet over the network. Another example of an event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102.

Figure 2:
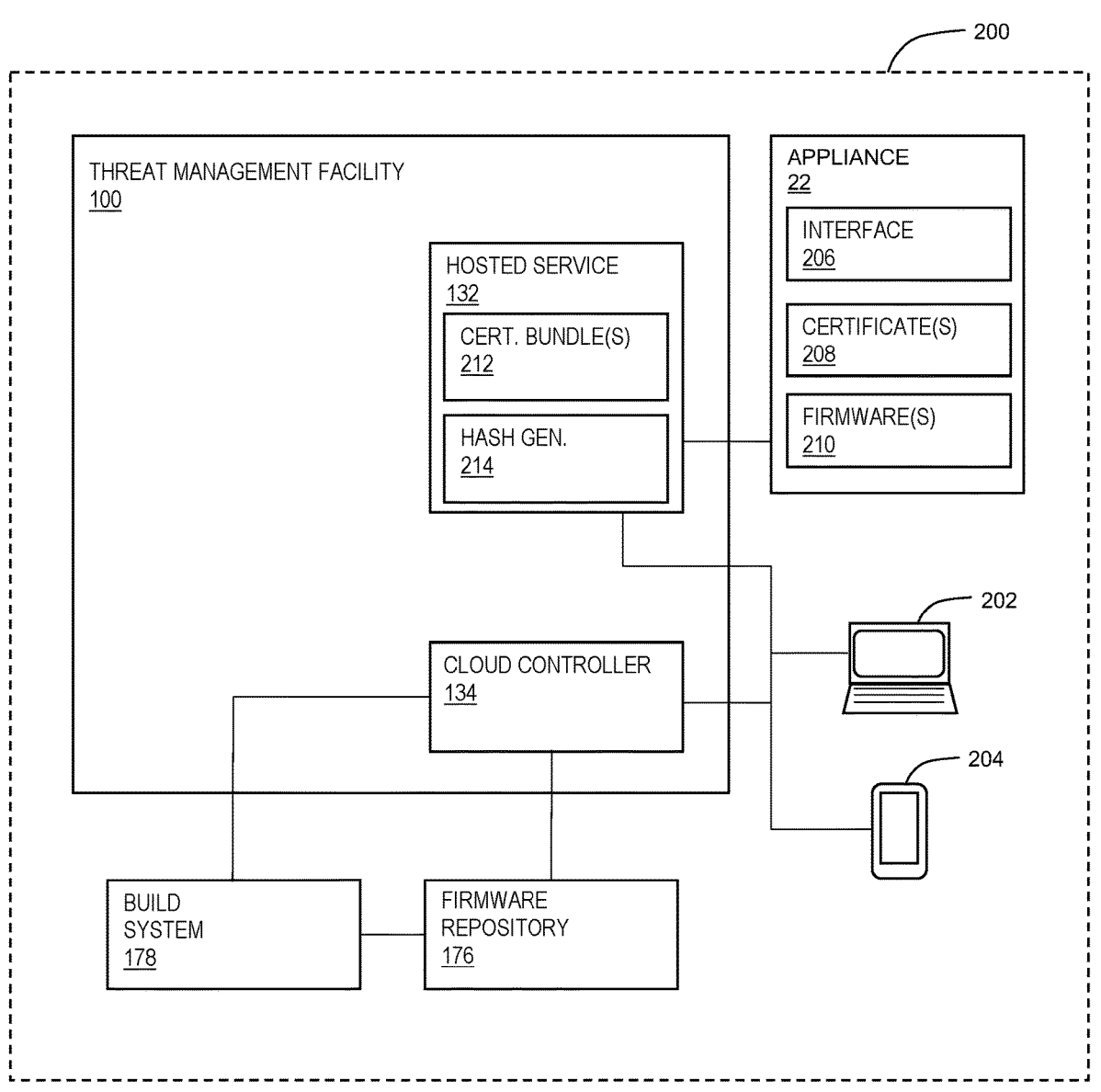
FIG. 2 illustrates a system for updating an appliance in accordance with one embodiment.

FIG. 2 illustrates a system 200 for updating an appliance 22 in accordance with one embodiment. In one embodiment, the system 200 may include components or services of the threat management facility 100 of FIG. 1 such as the hosted service 132 and the cloud controller 134.

The threat management facility 100 may be in communication with one or more devices or appliances (e.g., appliance 22, a personal computer (PC) 202, a mobile device 204, etc.). The hosted service 132, the cloud controller 134, or both, may be at different locations and may be instantiated by the threat management facility 100 or by some other network resource or at another location.

The appliance 22 may refer to a networking device such as a switch, firewall device, router, or the like. The features of the embodiments herein may be implemented in conjunction with any type of appliance, however. The appliance 22 may have been stored for an extended period of time (e.g., several months) before it was ultimately shipped to and set up by a customer.

The appliance 22 may execute or otherwise include an interface 206, one or more self-signed certificates 208, and firmware(s) 210. The self-signed certificates 208 and the firmware(s) 210 may be configured with the appliance 22 during manufacturing of the appliance 22.

The hosted service 132 may refer to a service executing on a server that can be hosted in a cloud-based network or at a physical data center. The hosted service 132 may be tasked with ensuring certificate bundles are available for the appliance 22.

The cloud controller 134 may be instantiated as a microservice that may be running on a public cloud network. For example, the cloud controller 134 may be instantiated on Amazon Web Service, Google Cloud, some other type of private or public cloud, or combinations thereof.

Generally, network appliances have two logical divisions: (1) the data plane in which manipulations for a network occur (e.g., data packet traveling), and (2) the control plane. The control plane may allow configuration of certain parameters regarding the appliance 22. For example, a device, user, or other entity, may, via a user interface, provide one or more configuration parameters to configure the appliance 22.

The firmware repository 176 may refer to a publicly-accessible server, a private service, or a combination of the two. In some embodiments, the firmware repository 176 may refer to a software-as-a-service repository provided by a third party.

The build system 178 may be tasked with generating or otherwise associated with the generation of new firmware. The build system 178 may be instantiated separately from the threat management facility 100 or as part of the threat management facility 100. In one embodiment, the build system 178 is instantiated as GNU Make, which is available from the Free Software Foundation, located in Boston, Massachusetts. In another embodiment, the build system 178 is instantiated as Jenkins, which is an open-source automation server and available for download from the Internet. In a further embodiment, the build system 178 is instantiated as CMake, which is available from Kitware, located in Clifton Park, New York. In yet another embodiment, the build system 178 is instantiated as Ninja, which is available as downloadable source code from GitHub®. Of course, the build system 178 may be instantiated as a combination of any of the preceding embodiments, or as any other automation, packaging, and installation system now known or later developed.

The build system 178 may be associated with an operator of the threat management facility 100 or some other entity. Whenever the build system 178 builds and releases a new firmware, it may produce a release manifest file that describes various properties associated with the firmware. For example, the metadata of the manifest file may include, for example and without limitation, the type of the appliance, the model number of the appliance, the Stock Keeping Unit (SKU) of the appliance, the geographic region of the appliance, the name of the customer using the appliance, or other such attributes or characteristics.

Figure 3:
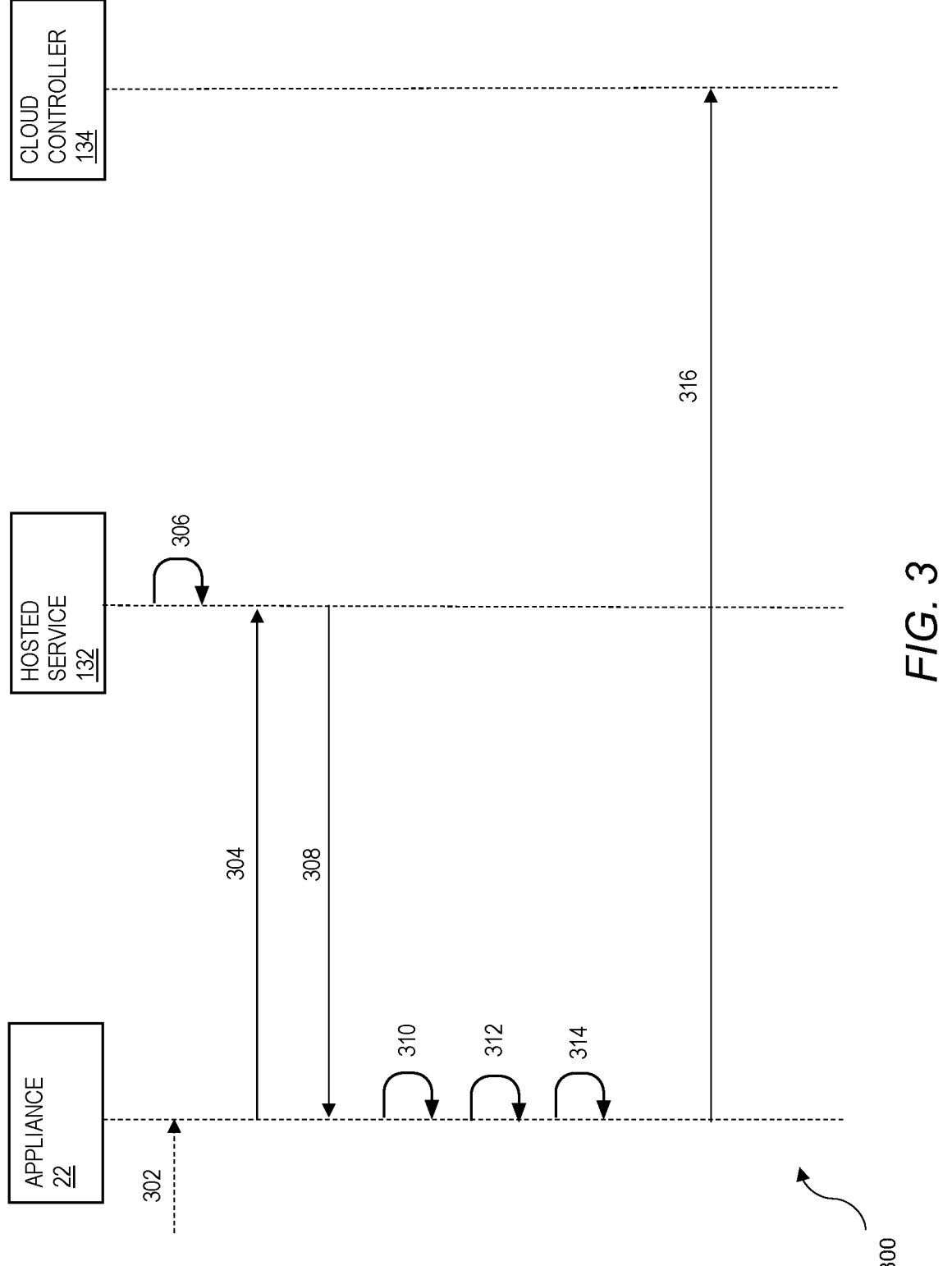
FIG. 3 depicts a message sequence diagram for updating certificates in accordance with one embodiment.

FIG. 3 depicts a message sequence diagram 300 for updating at least one certificate in accordance with one embodiment. The diagram 300 may involve one or more of the components illustrated in FIG. 2. Upon or shortly after bootup 302 of the appliance 22, such as when the purchaser of the appliance 22 first powers on the appliance 22, the appliance 22 may communicate a request 304 to the hosted service 132 for one or more certificates.

In one embodiment of message sequencing, the appliance 22 executes a representational state transfer application programming interface ("REST API") to make the request 304 for the one or more certificates. The appliance 22 may include in the request 304, and therefore provide to the hosted service 132 metadata about the appliance 22 such as the serial number of the appliance, the model number of the appliance, the type of firmware the appliance is using, the SKU, the geographical region of the appliance 22, the customer of the appliance 22, or any other type of metadata associated with the appliance 22. Additionally, as the appliance 22 may be manufactured with or otherwise include one or more self-signed certificates, the appliance 22 may also communicate any self-signed certificate(s) to the hosted service 132. These self-signed certificates may inform the appliance 22 which hosted service 132 to contact.

The hosted service 132 may routinely check 306 with certification authorities for new certificates. Similarly, the hosted service 132 may monitor the certification authorities and certificates associated with services running on a network such as the network 154 of FIG. 1.

Certificates may also expire at various predetermined times (e.g., at a predetermined time from the issuance of such certificate). For example, some existing certification authorities issue certificates that expire 18 months from issuance. As another example, the issuer of a certificate may change between the time of manufacturing and bootup, which may result in the appliance 22 not having the most up-to-date certificate(s) or the certificate(s) of the new certificate provider. More specifically, the firmware on the appliance 22 would not have the root certificate of the new certificate provider. Without the most up-to-date certificates or otherwise the certificate(s) of the new certificate provider, the appliance 22 would not be able to trust cloud devices such as the cloud controller 134. If the appliance 22 is not able to trust cloud devices such as the cloud controller 134, the appliance 22 may be unable to communicate with the cloud controller 134 or perform other actions associated with other cloud-based devices.

Based on the metadata received from the appliance 22, the hosted service 132 may respond 308 to the appliance 22 with a new certificate bundle. The hosted service 132 may communicate the bundle of certificates as a downloadable, zipped or unzipped file. In one embodiment, the new certificate bundle may include one or more certificates and, for each certificate, include data such as the expiration date of the certificate, name of the issuing authority, a serial number, a copy of the certificate holder's public key, and digital signature of the issuing authority.

The appliance 22 may first download the zipped file and validate 310 the signature of the received certificate bundle (s). For example, the appliance 22 may validate the signature by comparing hash values of keys associated with a certificate bundle. The hosted service 132 may include or otherwise execute a hash generation module 214 to compute a cryptographic hash value for a bundle to sign the bundle with a private key.

For example, in some embodiments, the hash generation module 214 may execute a Secure Hash Algorithm (SHA) such as hash functions associated with the SHA-2 or SHA-3 hash function families to calculate a hash pertaining to a certificate bundle. The appliance 22 may then use a public key to confirm that the hash value was signed with a matching private key associated with the hosted service 132.

The appliance 22 may then extract 312 the certificate(s) from the bundle. For example, the appliance 22 may, upon or after validating the signature, execute one or more extraction commands to extract the certificate(s) from the file.

The appliance 22 may then install 314 the extracted certificates. For example, the appliance 22 may add the certificate to its certificate store such that the appliance 22 can use to the certificate for various authentication purposes. In one embodiment, the appliance 22 may also delete or otherwise overwrite one or more non-usable certificates. At this point, the appliance 22 may use the installed certificates to communicate with the cloud controller 134. This communication 316 is trusted as the appliance 22 now has the certificates that allow the appliance 22 to know which resources (e.g., the cloud controller 134) to trust.

Figure 4:
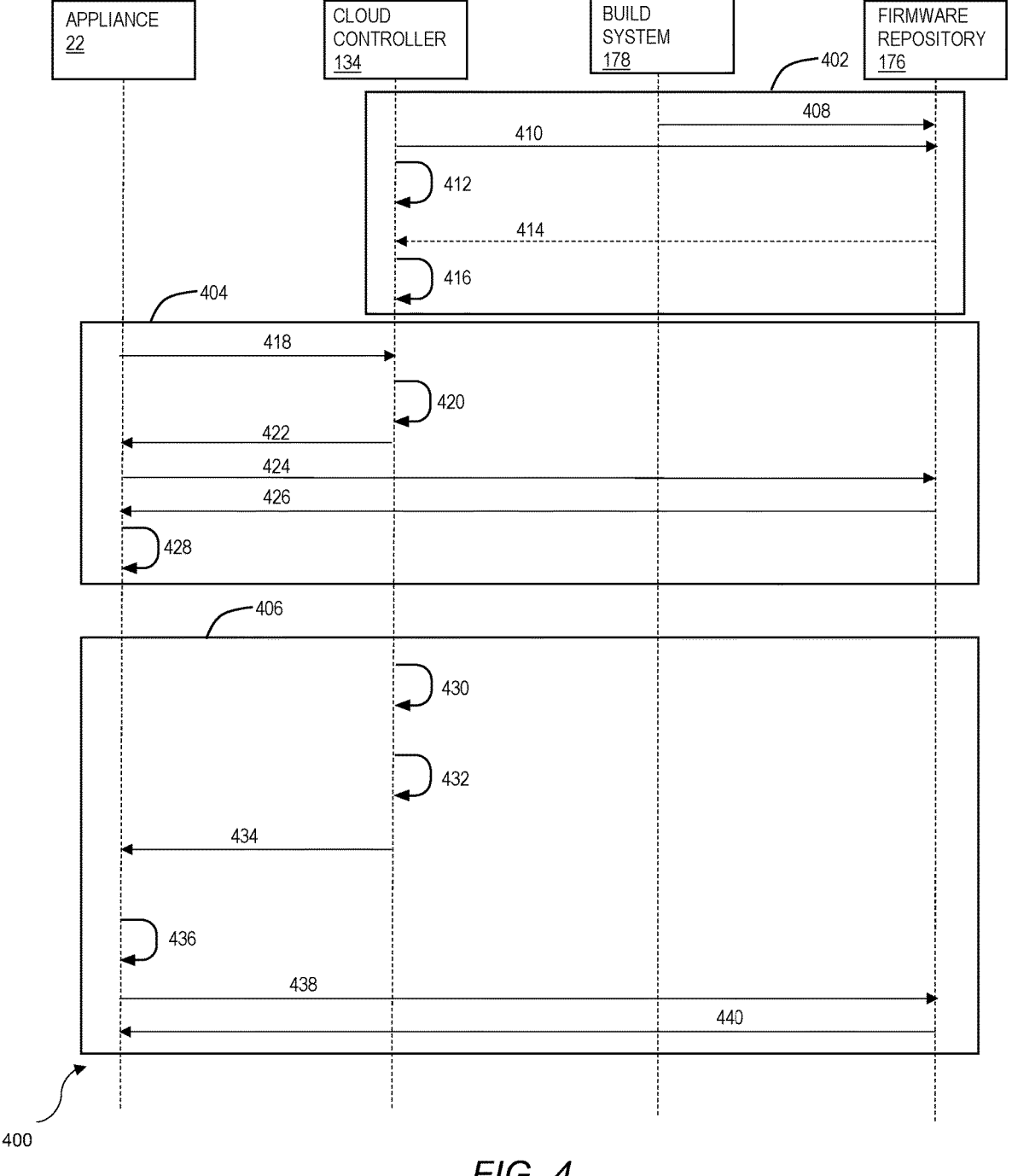
FIG. 4 depicts a message sequence diagram for updating firmware in accordance with one embodiment.

FIG. 4 depicts a message sequence diagram 400 for updating appliance firmware in accordance with one embodiment. In operation, the steps of the message sequence diagram 400 of FIG. 4 may occur after the steps of the message sequence diagram 300 of FIG. 3.

The process of updating appliance firmware as shown in the message sequence diagram 400 may be divided into three phases. These include a monitoring phase 402, a firmware downloading phase 404, and an ongoing updating phase 406.

Phase 402 may involve the cloud controller 134 maintaining an updated list of firmwares in the firmware repository 176. This allows the cloud controller 134 to keep track of new firmware releases. When a manufacturer builds and releases new firmware, the manufacturer also generates and releases a release manifest file for the firmware. The producer of the manifest file may be one or more of the build systems previously discussed (e.g., Jenkins, CMake, Ninja, etc.). Accordingly, phase 402 may first involve the build system 178 generating new firmware and providing 408 a manifest file to the firmware repository 176. The cloud controller 134 may then check for new manifest files for any new firmware 410.

The manifest file may be written in a data interchange format, such as JavaScript Object Notation (JSON). The manifest file may include characteristics and/or attributes that describe and/or associate firmware with corresponding appliances including, but not limited to, the type of appliance models for which a firmware version is valid, model numbers of appliances for which the firmware is valid, geographical regions in which the firmware is valid, or any other such characteristics and/or attributes. In some instances, the cloud controller 134 may be configured to periodically check the firmware repository 176 for new manifest files pertaining to new releases of firmware.

If a new release manifest is available 414 in the firmware repository 176, the cloud controller 134 may then write 416 the new release manifest or data associated therewith in a database (e.g., a database associated with the cloud controller 134, not shown in FIG. 4). Accordingly, whenever an appliance communicates with the cloud controller 134 and requests the latest (e.g., most recent) firmware details, the cloud controller 134 may not read the release manifest file in the firmware repository 176, but may instead refer to its own database for data associated with the latest release manifest information.

Phase 404 may involve the appliance 22, upon booting, obtaining the most up-to-date firmware. The appliance 22 may first provide 418 metadata to the cloud controller 134. The metadata may include, for example and without limitation, the type of the appliance, the model number of the appliance, the SKU of the appliance, the geographic region of the appliance, the name of the customer using the appliance, or the like.

The cloud controller 134 may then verify 420 the authenticity of the appliance 22 by executing any appropriate authentication procedures using integrated keys, certificates, or tokens. Upon or after verifying the authenticity of the appliance 22, the cloud controller 134 may provide a link 422 to the appliance 22. The link may be a uniform resource locator (URL) indicating a location in the firmware repository 176 from where the appliance 22 can obtain the desired firmware. The desired firmware may refer to the most up-to-date firmware, a version of firmware for a specific type of appliance, a version of firmware for a specific geographical region, or the like.

The appliance 22 may then request 424 the desired firmware from the corresponding location in the firmware repository 176. The appliance may then download 426 the firmware from the firmware repository 176. The appliance 22 may then validate 428 and install the downloaded firmware.

Phase 406 of diagram 400 may refer to a recurring schedule for providing firmware updates. Accordingly, even after bootup, the appliance 22 may continuously be informed of and updated to include the most up-to-date firmware.

The cloud controller 134 may be configured to periodically reference 430 a database for any new release manifests. For example, an administrator may configure a schedule 432 such that the cloud controller 134 may reference a database or network resource regarding new firmware hourly, daily, weekly, etc.

Upon identifying a new release, the cloud controller 134 may communicate 434 a message to the appliance 22 informing the client of the new firmware, including details about where the appliance 22 can obtain the new firmware. Similarly, the appliance 22 may reference 436 an internal schedule to determine if any executing firmware is set to expire.

The appliance 22 may then request 438 the desired firmware from the corresponding location in the firmware repository 176. The appliance 22 may then download 440 the firmware from the firmware repository 176. The appliance 22 may then validate and install the downloaded firmware as discussed previously.

FIG. 5 depicts a flowchart of a method 500 for updating a network appliance in accordance with one embodiment. The components of FIGS. 2-4 may perform one or more of the steps of method 500.

Step 502 involves receiving an update request from a network appliance 22, wherein the update request includes at least one self-signed certificate 208. Step 502 may occur upon or shortly after the network appliance 22 is booted up for the first time, such as at an on-premise, customer location. Upon booting up, the network appliance 22 may use stored self-signed certificates to reach out to a trusted hosted service 132.

Step 504 involves executing an authentication procedure to authenticate the network appliance. The hosted service 132 may perform any appropriate validation or authentication procedures to verify the identity of the network appliance 22.

Step 506 involves providing the network appliance 22 with at least one updated certificate associated with a controller device such as the cloud controller 134 of FIGS. 2-4. The provided certificate may have been issued by a certification authority that was previously unknown to the network appliance 22. This may occur if, for example, an amount of time had passed since the network appliance 22 was manufactured and was booted up for the first time such that the certification authority that issued original certificates for the appliance 22 had changed. Or, certificates stored on or otherwise configured with the network appliance 22 may have expired.

Step 508 involves enabling communication between the appliance 22 and the controller device such as the cloud controller 134. Once or after the network appliance 22 receives any new certificate(s) 212, the network appliance may communicate with the controller device.

Step 510 involves providing to the appliance 22 a network resource location indicator of a firmware repository 176 including an updated firmware version to allow the appliance to obtain the updated firmware version. The firmware initially installed on the appliance 22 during manufacture may have become outdated by the time it is booted up. Accordingly, the cloud controller 134 may provide the appliance 22 with a link from where the appliance 22 can obtain the most up-to-date firmware.

The disclosed embodiments provide novel techniques and advantages over existing techniques for updating network appliances. Existing techniques generally involve a user manually updating a single appliance with new firmware or certificates such as after booting up of the appliance. This is time-consuming, resource-intensive, and may result in several different appliances having different firmwares.

The features of the disclosed embodiments, on the other hand, may provide targeted certificate and firmware releases at or shortly after an appliance boots up for the first time. Once the appliance is booted up for the first time, the embodiments herein may automatically update the appliance with certificates to ensure the appliance communicates with trusted resources and operates with the latest available firmware. This may occur before any other operations or configurations are enabled on the appliance. The embodiments described herein may also perform targeted releases to certain appliances based on, for example, appliance serial number(s), model number(s), customer(s), geographical locations of the appliances, or the like.

According to one aspect, embodiments relate to a method for updating a network appliance. The method includes receiving an update request from a network appliance, wherein the update request includes at least one self-signed certificate; executing an authentication procedure to authenticate the network appliance; providing the network appliance with at least one updated certificate associated with a controller device; enabling communication between the appliance and the controller device; and providing to the appliance a network resource location indicator of a firmware repository including an updated firmware version to allow the appliance to obtain the updated firmware version.

In some embodiments, the update request is received from the network appliance upon the network appliance booting up.

In some embodiments, the network resource location indicator is a uniform resource locator (URL).

In some embodiments, the update request includes metadata associated with the appliance, and the provided network resource location indicator of the firmware repository is based on the metadata associated with the appliance. In some embodiments, the metadata includes a serial number of the appliance, a model number of the appliance, a type of firmware the appliance is using, the appliance's stock keeping unit (SKU).

In some embodiments, the method further includes generating a manifest file associated with the updated firmware version, wherein the manifest file includes data including a type of network appliance for which the updated firmware version is valid.

In some embodiments, the method further includes validating the at least one updated certificate and installing the at least one updated certificate on the network appliance.

According to another aspect, embodiments relate to a system for updating a network appliance. The system includes an interface for at least receiving an update request from a network appliance, wherein the update request includes at least one self-signed certificate; and one or more processors executing instructions stored on memory to provide the network appliance with at least one updated certificate associated with a controller device, enable communication between the appliance and a controller device, and provide to the appliance a network resource location indicator of a firmware repository including an updated firmware version to allow the appliance to obtain the updated firmware version.

In some embodiments, the update request is received from the network appliance upon the network appliance booting up.

In some embodiments, the network resource location indicator is a uniform resource locator (URL).

In some embodiments, the update request includes metadata associated with the appliance, and the provided network resource location indicator of the firmware repository is based on the metadata associated with the appliance. In some embodiments, the metadata includes a serial number of the appliance, a model number of the appliance, a type of firmware the appliance is using, the appliance's stock keeping unit (SKU).

In some embodiments, the one or more processors are further configured to generate a manifest file associated with the updated firmware version, wherein the manifest file includes data including a type of network appliance for which the updated firmware version is valid.

In some embodiments, the one or more processors are further configured to validate the at least one updated certificate and install the at least one updated certificate on the network appliance According to yet another aspect, embodiments relate to a computer program product for updating a network appliance, the computer program product comprising computer executable code embodied in one or more non-transitory computer readable media that, when executing on one or more processors, performs the steps of receiving an update request from a network appliance, wherein the update request includes at least one self-signed certificate, executing an authentication procedure to authenticate the network appliance, providing the network appliance with at least one updated certificate associated with a controller device, enabling communication between the appliance and the controller device, providing to the appliance a network resource location indicator of a firmware repository including an updated firmware version to allow the appliance to obtain the updated firmware version.

In some embodiments, the update request is received from the network appliance upon the network appliance booting up.

In some embodiments, the network resource location indicator is a uniform resource locator (URL).

In some embodiments, the update request includes metadata associated with the appliance, and the provided network resource location indicator of the firmware repository is based on the metadata associated with the appliance. In some embodiments, the metadata includes a serial number of the appliance, a model number of the appliance, a type of firmware the appliance is using, the appliance's stock keeping unit (SKU).

In some embodiments, the computer program product further includes computer executable code embodied in one or more non-transitory computer readable media that, when executing on one or more processors, performs the step of generating a manifest file associated with the updated firmware version, wherein the manifest file includes data including a type of network appliance for which the updated firmware version is valid.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for updating a network appliance, the method comprising:
    receiving an update request from the network appliance, wherein the update request includes at least one self-signed certificate, wherein the update request is received from the network appliance upon the network appliance booting up;
    executing an authentication procedure to authenticate the network appliance;
    providing the network appliance with at least one updated certificate associated with a controller device;
    enabling communication between the network appliance and the controller device; and
    providing to the network appliance a network resource location indicator of a firmware repository including an updated firmware version to allow the network appliance to obtain the updated firmware version.

2. The method of claim 1 wherein the network resource location indicator is a uniform resource locator (URL).

3. The method of claim 1 wherein the update request includes metadata associated with the appliance, and the provided network resource location indicator of the firmware repository is based on the metadata associated with the network appliance.

4. The method of claim 3 wherein the metadata includes a serial number of the network appliance, a model number of the network appliance, a type of firmware the appliance is using, the appliance's stock keeping unit (SKU).

5. The method of claim 1 further comprising generating a manifest file associated with the updated firmware version, wherein the manifest file includes data including a type of network appliance for which the updated firmware version is valid.

6. The method of claim 1 further comprising:
    validating the at least one updated certificate, and
    installing the at least one updated certificate on the network appliance.

7. A system for updating a network appliance, the system comprising:
    an interface for at least receiving an update request from the network appliance, wherein the update request includes at least one self-signed certificate, and the update request is received from the network appliance upon the network appliance booting up; and
    one or more processors executing instructions stored on memory to:
    receive the update request from the network appliance;
    execute an authentication procedure to authenticate the network appliance;
    provide the network appliance with at least one updated certificate associated with a controller device;
    enable communication between the network appliance and the controller device; and
    provide to the network appliance a network resource location indicator of a firmware repository including an updated firmware version to allow the network appliance to obtain the updated firmware version.

8. The system of claim 7 wherein the network resource location indicator is a uniform resource locator (URL).

9. The system of claim 7 wherein the update request includes metadata associated with the network appliance, and the provided network resource location indicator of the firmware repository is based on the metadata associated with the network appliance.

10. The system of claim 9 wherein the metadata includes a serial number of the network appliance, a model number of the appliance, a type of firmware the network appliance is using, the network appliance's stock keeping unit (SKU).

11. The system of claim 7 wherein the one or more processors are further configured to generate a manifest file associated with the updated firmware version, wherein the manifest file includes data including a type of network appliance for which the updated firmware version is valid.

12. The system of claim 7 wherein the one or more processors are further configured to validate the at least one updated certificate and install the at least one updated certificate on the network appliance.

13. A computer program product for updating a network appliance, the computer program product comprising computer executable code embodied in one or more non-transitory computer readable media that, when executing on one or more processors, performs steps of:

receiving an update request from the network appliance, wherein the update request includes at least one self-signed certificate and the update request is received from the network appliance upon the network appliance booting up;

executing an authentication procedure to authenticate the network appliance;

providing the network appliance with at least one updated certificate associated with a controller device;

enabling communication between the network appliance and the controller device; and providing to the network appliance a network resource location indicator of a firmware repository including an updated firmware version to allow the network appliance to obtain the updated firmware version.

14. The computer program product of claim 13 wherein the network resource location indicator is a uniform resource locator (URL).

15. The computer program product of claim 13 wherein the update request includes metadata associated with the network appliance, and the provided network resource location indicator of the firmware repository is based on the metadata associated with the network appliance.

16. The computer program product of claim 15 wherein the metadata includes a serial number of the network appliance, a model number of the network appliance, a type of firmware the appliance is using, the appliance's stock keeping unit (SKU).

17. The computer program product of claim 13 further comprising computer executable code embodied in one or more non-transitory computer readable media that, when executing on one or more processors, performs the step of generating a manifest file associated with the updated firmware version, wherein the manifest file includes data including a type of network appliance for which the updated firmware version is valid.

18. The method of claim 1 wherein the update request includes the network appliance's geographical location, and the updated firmware version is specific to the network appliance's geographical location.

19. The system of claim 1 wherein the update request includes the network appliance's geographical location, and the updated firmware version is specific to the network appliance's geographical location.

20. The computer program product of claim 15 wherein the update request includes the network appliance's geographical location, and the updated firmware version is specific to the network appliance's geographical location.

* * * * *